(No Model.)
M. BEAMER.
VEGETABLE CUTTER.
No. 553,385. Patented Jan. 21, 1896.
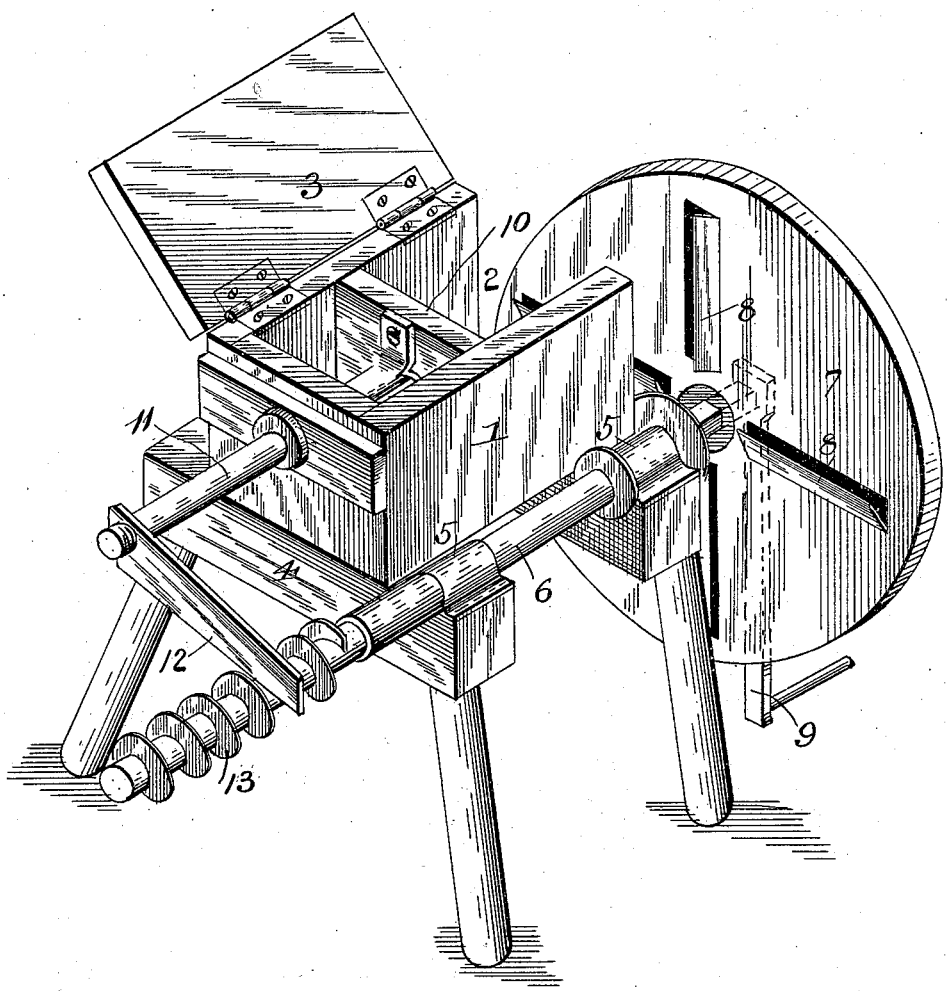
Witnesses
F. L. Durand.
A. S. Suit.
Inventor
Mike Beamer.
By H. D. Willson.
Attorney

UNITED STATES PATENT OFFICE.

MIKE BEAMER, OF LOGANSPORT, INDIANA.

VEGETABLE-CUTTER.

SPECIFICATION forming part of Letters Patent No. 553,385, dated January 21, 1896.

Application filed August 15, 1895. Serial No. 559,400. (No model.)

*To all whom it may concern:*

Be it known that I, MIKE BEAMER, a citizen of the United States, residing at Logansport, in the county of Cass and State of Indiana, have invented certain new and useful Improvements in Vegetable-Cutters; and I do declare the following to be a full, clear, and exact description of the invention, such as will enable others skilled in the art to which it appertains to make and use the same.

My invention relates to vegetable-cutters, and more particularly to a cutter adapted to cut cabbage into strips to be used in making sauer-kraut.

The object of my invention is to provide a device of this character which shall be simple of construction, durable in use and comparatively inexpensive of production, and, furthermore, to provide the cutter with a plunger or follower and a foot by which the plunger or follower is actuated to force the vegetable through the cutter.

With these objects in view the invention consists of certain features of construction and combination of parts, which will be hereinafter fully described and claimed.

In the accompanying drawing the figure is a perspective view of my improved vegetable-cutter, showing one means for moving the plunger toward the rotary cutter.

In the drawing, 1 denotes the hopper or receptacle into which the vegetables are placed to be cut. This hopper is provided with an open end 2 and a hinged top 3 and is supported upon a bench 4. Journaled in boxes 5, secured to the cross-pieces of the bench, is a rotary shaft 6, to which is splined a rotary cutter-disk 7 having cutters 8 which traverse the open end of the hopper. A crank 9 is secured to the forward extreme end of the shaft and by means of which the cutter-disk is rotated. Arranged in the boxes is a follower or plunger 10 for the purpose of forcing the vegetable to the cutters on the disk. This plunger or follower has secured to it and projecting through an aperture in the closed end of the hopper a rod 11, which has screwed upon its rear end an arm 12.

As shown in the figure, I have coupled a worm 13 to the rear end of the cutter-shaft and have swung the arm into engagement with the said worm, so that as the shaft is rotated the follower or plunger will be advanced forward, thus moving the vegetable to the cutters. This arm is made removable from the shaft, as also is the worm, to allow for the storage of the cutter in a small space when not in use, the arm and worm being of such size as to allow it to be placed into the hopper when the plunger therein has been moved over toward and closes the open end of the hopper.

Having thus described my invention, what I claim, and desire to secure by Letters Patent, is—

The combination with the hopper having an open end, a rotary shaft, a rotary cutter disk keyed to said shaft and provided with cutters traversing the open end of the hopper, a plunger or follower located in said hopper and the rod secured to said plunger and projecting out through the closed end of said hopper, of the worm secured to the rear end of said shaft, the arm journaled on the rear end of said rod and having its outer end engaging between the spirals of the worm, and an operating handle connected to the front of said shaft, substantially as described.

In testimony whereof I affix my signature in presence of two witnesses.

MIKE BEAMER.

Witnesses:
J. M. BLISS,
JOHN H. SCHWERDMAN.